United States Patent
Cvijetic et al.

(10) Patent No.: US 9,735,863 B2
(45) Date of Patent: Aug. 15, 2017

(54) LOW-LATENCY SYNCHRONOUS CLOCK DISTRIBUTION AND RECOVERY FOR HIGH-SPEED OFMDA-BASED MOBILE BACKHAUL

(71) Applicant: NEC Laboratories America, Inc., Princeton, NJ (US)

(72) Inventors: Neda Cvijetic, Plainsboro, NJ (US); Ming Zhu, Atlanta, GA (US)

(73) Assignee: NEC Corporation, Tokyo (JP)

( * ) Notice: Subject to any disclaimer, the term of this patent is extended or adjusted under 35 U.S.C. 154(b) by 310 days.

(21) Appl. No.: 14/504,423

(22) Filed: Oct. 2, 2014

(65) Prior Publication Data
US 2015/0092759 A1      Apr. 2, 2015

Related U.S. Application Data

(60) Provisional application No. 61/885,565, filed on Oct. 2, 2013.

(51) Int. Cl.
 *H04B 10/00*      (2013.01)
 *H04B 7/26*       (2006.01)
 *H04W 56/00*      (2009.01)

(52) U.S. Cl.
 CPC ........ *H04B 7/2665* (2013.01); *H04W 56/001* (2013.01)

(58) Field of Classification Search
CPC ............................ H04B 7/2665; H04W 56/001
USPC ................................................. 398/154, 155
See application file for complete search history.

(56) References Cited

U.S. PATENT DOCUMENTS

| | | | | |
|---|---|---|---|---|
| 8,184,979 B2* | 5/2012 | Wei | ...................... | H04J 14/0282 398/79 |
| 8,487,795 B1* | 7/2013 | Jiang | ..................... | G11C 27/024 327/415 |
| 2003/0043433 A1* | 3/2003 | White | ................... | H04L 7/0075 398/154 |
| 2004/0067059 A1* | 4/2004 | Song | ....................... | H04J 14/02 398/82 |

(Continued)

*Primary Examiner* — Ken N Vanderpuye
*Assistant Examiner* — Amritbir Sandhu
(74) *Attorney, Agent, or Firm* — Joseph Kolodka

(57) ABSTRACT

A communication system includes an OFDMA transmitter (Tx) at an optical line terminal (OLT) generating an OFDMA signal by assigning orthogonal subcarriers to different cell sites through digital logic, an electrical multiplexer combining the electrical OFDMA signal with two electrical clock signals, and an optical intensity modulator intensity-modulating the resulting joint electrical OFDMA+ clocks signal; an optical multiplexer receiving aggregate OFDMA signals on multiple wavelengths with tight DWDM λ-spacing; a remote node (RN) receiving the OFDMA signals, such that each wavelength is distributed by a demultiplexer (Demux) to designated general small cell area, to which cell sites are connected by optical splitters; and an optical network unit (ONU) to directly photodetect and digitize received OFDMA signal, wherein downstream (DS) information for each cell is digitally extracted and prepared for wireless radio frequency (RF) transmission over an air interface, and an electrical splitter and bandpass filters to separate the OFDMA and clock signals for DSP-free clock recovery.

15 Claims, 3 Drawing Sheets

(56) References Cited

U.S. PATENT DOCUMENTS

| | | | |
|---|---|---|---|
| 2005/0245192 A1* | 11/2005 | Karabinis | H04B 1/006 455/12.1 |
| 2007/0264026 A1* | 11/2007 | Miguel | H03K 5/135 398/155 |
| 2010/0215368 A1* | 8/2010 | Qian | H04J 14/0282 398/67 |
| 2010/0239253 A1* | 9/2010 | Lin | H04J 14/0282 398/63 |
| 2013/0108271 A1* | 5/2013 | Tang | H04L 7/0008 398/66 |
| 2013/0216229 A1* | 8/2013 | Cvijetic | H04B 10/25753 398/66 |
| 2017/0041891 A1* | 2/2017 | Chae | H04W 56/00 |

\* cited by examiner

LOW-LATENCY SYNCHRONOUS CLOCK DISTRIBUTION AND RECOVERY FOR HIGH-SPEED OFMDA-BASED MOBILE BACKHAUL

This application claims priority to Provisional Application No. 61/885,565 filed Oct. 2, 2013, the content of which is incorporated by reference.

BACKGROUND

Propelled by emerging smart mobile devices and applications, the mobile data traffic is projected to increase 13-fold between 2012 and 2017. To accommodate the targeted data rate requirements, such as 1-Gb/s per cell site in the Long Term Evolution-Advanced (LTE-A) standard, a large number of small cells that reuse available spectrum will be needed to provide economical high-speed mobile traffic delivery. As a result, the ability to cost-efficiently support high data rates with low latency are among the essential requirements for fourth-generation and beyond (4+G) mobile backhaul (MBH) systems. From the technical perspective, synchronization is a fundamental requirement to realize all of these key features. Moreover, as data rates and latency requirements continue to rise, legacy synchronization techniques may mandate careful re-design to keep up with the dramatic traffic and architectural changes of 4+G mobile backhaul systems.

In legacy MBH systems, base stations are typically connected to T1/E1 copper lines and merged into the synchronous optical network/synchronous digital hierarchy (SONET/SDH) in which the timing information from the primary reference clock (PRC) is inherently built into the transport layer, and slave clocks at base stations are traceable to the PRC. However, as MBH networks migrated from the legacy time division multiplexing (TDM)-based architecture to packet switched operation, new synchronization techniques and protocols were needed and proposed to distribute synchronization information. The two primary methods in this space are Synchronous Ethernet (SyncE), as defined by the ITU-T in Study Group 15, Question 13 (Q13/15) and the Precision Time Protocol (PTP) as defined by the IEEE 1588v2 standard. SyncE provides accurate frequency distribution at the physical layer, but is not protocol-transparent; it requires that each node in the network be SyncE enabled, which might not suit all deployment scenarios. The PTP protocol distributes frequency and time synchronization via timing information carried by the packets, yet also needs customized hardware for timing measurements, and suffers from traffic-dependent synchronization accuracy. It has thus been suggested to combine SyncE and PTP to ensure end-to-end high accuracy. However, this approach involves both physical and packet layer processing, and can also increase processing complexity and delay and pose a challenge to satisfying low-latency requirements of future MBH systems, particularly as data rate requirements for backhaul systems increase beyond 10 Gb/s per-channel.

Optical MBH based on intensity modulation/direct detection (IMDD) orthogonal frequency division multiple access (OFDMA) techniques for high-speed, low latency optical MBH to hundreds of cells per fiber have been demonstrated. However, to practically implement OFDMA-based optical MBH, novel low-latency synchronization techniques are needed. Specifically, in addition to system-level synchronization, symbol-level synchronization in both the OFDMA transmitter and receiver is also needed for accurate real-time transmission. In optical OFDM-based access networks where latency is not a critical issue, the timing information can be embedded in the received OFDM signal and recovered through intensive digital signal processing (DSP). Recently, digital signal processing (DSP)-free synchronous clock distribution based on out-of-band and in-band clock transmissions and electrical filtering have shown for single-wavelength directly-detected optical OFDM systems. However, the frequency and time alignment performance with respect to 4+G mobile backhaul requirements was not evaluated. Moreover, only fixed-rate rather than flexible clocks were considered in conventional systems, and pre-scalers were needed to derive both low-frequency square wave clocks for digital circuits and high-frequency sine wave clocks for sensitive mixed-signal circuits, such as digital-to-analog converters (DAC) and analog-to-digital converters (ADC).

SUMMARY

In one aspect, a communication system includes an OFDMA transmitter (Tx) at an optical line terminal (OLT) generating an OFDMA signal by assigning orthogonal subcarriers to different cell sites through digital logic and then intensity-modulating the resulting electrical OFDMA signal; an electrical multiplexer combining the electrical OFDMA signal with two electrical clock signals, and an optical intensity modulator intensity-modulating the resulting joint electrical OFDMA+clocks signal; an optical multiplexer receiving aggregate OFDMA signals on multiple wavelengths with tight DWDM λ-spacing; a remote node (RN) receiving the OFDMA signals, such that each wavelength is distributed by a de-multiplexer (Demux) to designated general small cell area, to which cell sites are connected by optical splitters; and an optical network unit (ONU) to directly photodetect and digitize received OFDMA signal, wherein downstream (DS) information for each cell is digitally extracted and prepared for wireless radio frequency (RF) transmission over an air interface, and an electrical splitter and bandpass filters to separate the OFDMA and clock signals.

Advantages of the system may include one or more of the following. A low-complexity and low-latency clock distribution and recovery scheme for IMDD DWDM-OFDMA-based optical MBH is disclosed with flexible clock rates and DSP-free clock recovery through electrical splitting and filtering. The clocks are time and frequency synchronous with the OFDMA data signal due to optical locking that occurs during intensity modulation of the combined Tx-side data/clock signal. Reconfigurable data and clock rates as well as flex-grid λ planning are supported, which is motivated by the potential to integrate the optical MBH segment into a software-defined networking (SDN) resource provisioning and management framework. In our experiments, both a 50-MHz square wave and 4-GHz sine wave clock are distributed and recovered along with an aggregate 41.09-Gb/s DWDM-OFDMA data signal over 40 km SSMF in a spectrally-efficient 25-GHz DWDM grid. The flexibility of both the OFDMA signal rates and clock rates of the proposed system was confirmed by another set of 51.31-Gb/s DWDM-OFDMA data transmission experiments, with 50-MHz square wave and 5-GHz sine wave clock distribution and recovery. Experimental results confirm highly precise time and frequency accuracy, exceeding LTE-A requirements by an order of magnitude. By supporting high data rates with low-latency synchronization, the system is attractive for future optical MBH.

DESCRIPTION

Figure 1:
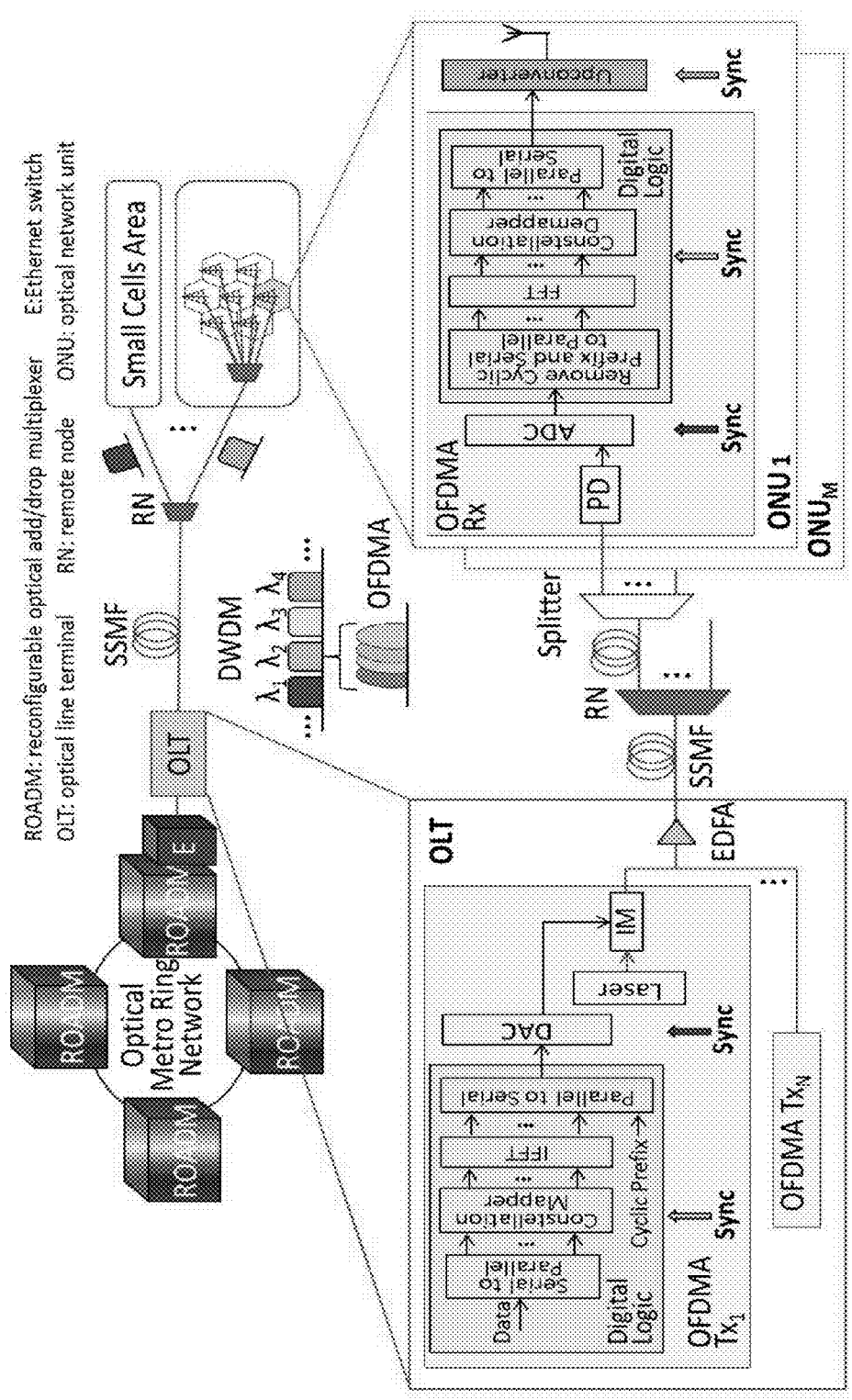
FIG. 1 shows an exemplary system architecture of DWDM-OFDMA-based MBH and synchronization requirements.

FIG. 1 illustrates the proposed architecture of the DWDM-OFDMA-based next-generation optical MBH, which can be merged to the edge of the optical metro network via metro Ethernet switches, for example. As shown in FIG. 1, in the OFDMA transmitter (Tx) at the optical line terminal (OLT), the OFDMA signal is generated by assigning orthogonal subcarriers to different cell sites through DSP in digital logic such as field programmable gate array (FPGA) or application specific integrated circuit (ASIC), and then intensity-modulating the resulting electrical OFDMA signal. The aggregate OFDMA signals on multiple wavelengths $\lambda_i$, i=1, 2, ..., N are optically multiplexed with tight DWDM $\lambda$-spacing, $f_s$. At the remote node (RN), each wavelength is distributed by a de-multiplexer (Demux) to designated general small cell area, to which cell sites are connected by optical splitters. At each MBH optical network unit (ONU), the received OFDMA signal is directly photo-detected and digitized. The downstream (DS) information for each cell is then digitally extracted and prepared for wireless radio frequency (RF) transmission over the air interface. In this way, the optical access network infrastructure is able to cover large mobile user service area by grouping high-density small cells, while efficient statistical multiplexing of traffic between cells is achieved via OFDMA-based dynamic bandwidth allocation.

Table I summarizes the mobile backhaul frequency accuracy requirements in terms of parts per billion (ppb) and time-of-day accuracy requirements in microseconds for synchronization in the common air interface specifications. As shown in the second column of Table 1, higher frequency accuracy is required for the mobile backhaul network compared to the air interface (e.g. 16 ppb is required for the network supporting applications operating with 50 ppb accuracy). As wireless technology evolves to both higher data rates and higher quality-of-service, synchronization requirements must become stricter. Therefore, future-proof clock distribution and recovery for 4+G MBH should both meet and preferably exceed the requirements of LTE-A shown in Table 1.

TABLE I

MOBILE BACKHAUL SYNCHRONIZATION REQUIREMENTS

| Technology | Frequency Network/Air | Time |
|---|---|---|
| GSM, UMTS, WCDMA, LTE - FDD | 16 ppb/50 ppb | None |
| CDMA 2000 | 16 ppb/50 ppb | 3-10 μs |
| LTE - TDD | 16 ppb/50 ppb | 1.5 μs < 3 km cell radius<br>5 μs > 3 km cell radius |
| LTE-Advaaced | 16 ppb/50 ppb | <1 μs |

Moreover, as shown in FIG. 1, additional OFDMA-related synchronization functions are needed in addition to the requirements of Table 1, to support practical real-time operation of DWDM-OFDMA-based MBH systems. In terms of real-time OFDMA transmission, FPGAs and/or ASICs that perform real-time DSP functions including the fast Fourier transform (FFT) and inverse FFT (IFFT), require a square wave clock input for synchronization. Digital to analog and analog to digital converters (DAC/ADC) at the analog electrical front end mandate sinusoidal clock inputs. Two clock signals are thus required for real-time OFDMA transmission—a square wave clock that feeds the digital logic and a high-frequency (multi-GHz) sine wave clock serving as the sampling clock reference for the DAC/ADC. It is noted that the square wave clock for the digital logic can also serve to provide both of which may be required for the 4+G mobile system air interface. Symbol-level synchronization accuracy between the square and sine is also necessary for correct OFDMA signal generation and reception. The clocks used in end-to-end OFDMA transmission should all be synchronized on the system level as well, should be recoverable without intensive DSP to minimize latency, and should support an overall clocked OFDMA system that is not prohibitively impaired by sampling clock offset (SCO) and symbol timing offset (STO). The proposed DWDM-OFDMA approach thus enables synchronous clock distribution without the need to involve with packet-based synchronization approaches that may require hop-by-hop hardware/protocol specificity and network engineering to manage jitter. Although the global positioning system (GPS) could also be employed at cell sites for air interface synchronization, its line-of-sight nature and security issues nonetheless urge the development of new synchronization schemes. Moreover, in the proposed approach, clocks are centrally controlled and distributed to the BS, offering attractive scalability potential and a natural compatibility with centralized SDN-based management.

The system's clock distribution and recovery scheme that fully takes advantage of the low-latency DWDM-OFDMA-based MBH architecture and satisfies (and exceeds) the above-mentioned synchronization requirements is proposed and discussed next.

As described in the previous section, all of the square and sine clocks needed for real-time OFDMA data signal transmission are simultaneously able to serve as highly accurate time and frequency reference for BSs in DWDM-OFDMA-based optical MBH featuring scalable and efficient centralized management.

Figure 2:
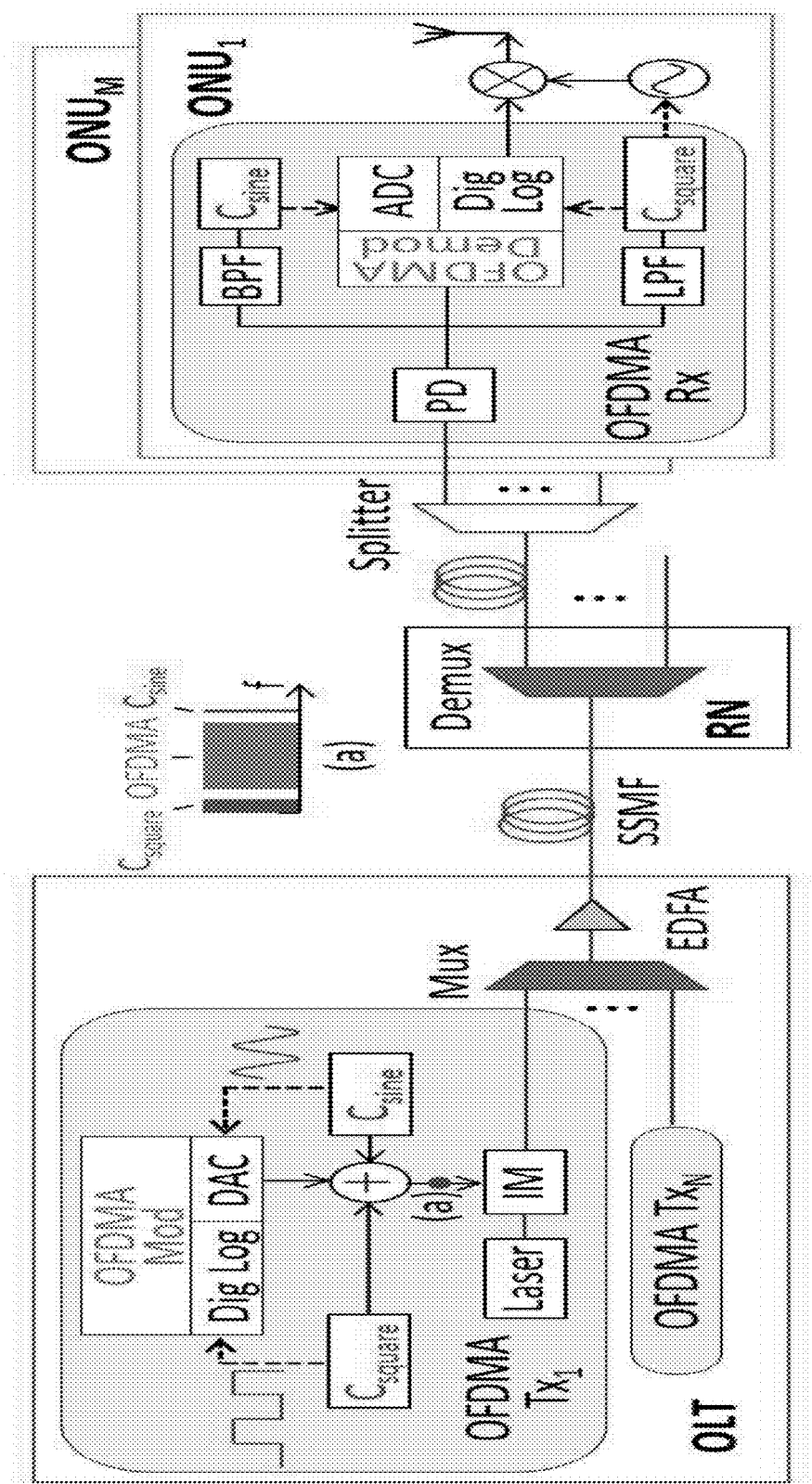
FIG. 2 shows an exemplary diagram of low-latency synchronous clock distribution and recovery principles for DWDM-OFDMA-based 4+G optical MBH.

The detailed operational principles of the DWDM-OFDMA-based technique for optical MBH is shown in FIG. 2. As illustrated in FIG. 2, the OFDMA modulator (Mod) in the OLT generates an electrical OFDMA signal using two clocks: a baseband square wave clock, $C_{square}$, that controls Tx-side digital logic (Dig Log) and a sine wave clock $C_{sine}$ that controls the DAC. The two clocks are generated from a common reference clock in order to be synchronous. At the DAC output, the OFDMA signal is electrically combined with the two clock signals, and the aggregate electrical signal is applied as input to an optical intensity modulator (IM). As shown in FIG. 2(a), the OFDMA data and clock signals are separated in frequency domain with moderate guard bands. Link rate and clock rates can be thus flexibly changed without significant changes to the remote nodes, which is preferable for cost-efficiency. The combined optical data/clock signals from each OFDMA Tx are multiplexed using a DWDM multiplexer (Mux), and wavelength-demultiplexed in the RN to serve designated ONUs. At each ONU, the joint data/clock signal is directly detected by a PD and electrically split into three parts. A band-pass filter (BPF) and a low-pass filter (LPF) with matching passbands are deployed to filter out $C_{sine}$ and $C_{square}$, respectively, for DSP-free clock recovery. Both clocks are thus retrieved without computational complexity or delay. The clocks are moreover time and frequency synchronized with the OFDMA data signal due to the optical locking that occurs during intensity modulation of the combined Tx-side data/clock signal. Following Rx-side OFDMA data processing, the DS traffic is extracted and re-modulated into the target wireless format by the RF module, for which $C_{square}$ can be multiplied using a phase locked loop (PLL) to achieve the desired carrier frequency. It is also noted that Csine can likewise be divided and used as a frequency reference. Therefore, frequency and phase of the clock signals are precisely maintained after direct photodetection, guaranteeing high synchronization accuracy.

Figure 3:
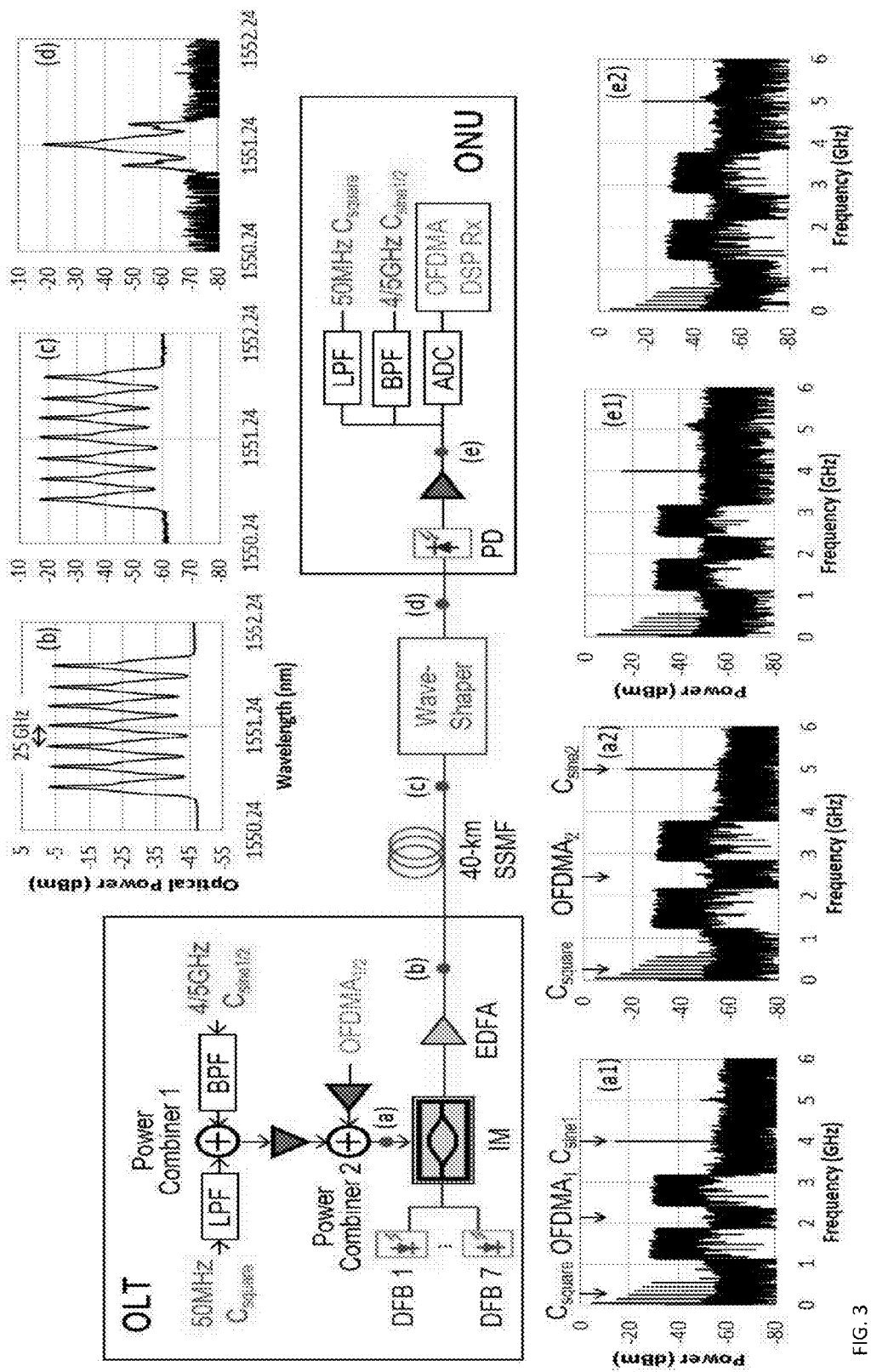
FIG. 3 shows an exemplary DWDM-OFDMA-based MBH system with the low-latency synchronization scheme.

FIG. 3 shows the experimental setup of the proposed DWDM-OFDMA-based optical MBH approach featuring a flexible, low-latency synchronization scheme. A 50-MHz square wave clock, Csquare with a 50% duty cycle was generated by a Pulse Pattern Generator using a 100 Mb/s on-off keying (OOK) signal, while Csine was produced by an Analog Signal Generator at frequencies of 4 GHz or 5 GHz, denoted as Csine1 and Csine2, respectively. A 520 MHz LPF and a 3.4-9.9 GHz BPF were imposed before Csquare and Csine are combined by an electrical power combiner (non-directional), in order to reduce reflections from other ports. Clocks were then electrically amplified and added with the generated OFDMA signal from a 12 Gs/s arbitrary waveform generator (AWG). The first OFDMA signal set featured 16-quadrature amplitude modulation (16-QAM), FFT size of 512 and consisted of two sub-bands at intermediate frequencies (IFs) of 1.5 GHz and 2.8 GHz, a raw data rate of 5.87 Gb/s, and is denoted as OFDMA1 in FIG. 3.

The experiments show low-latency synchronous clock distribution and recovery scheme for DWDM-OFDMA-based optical MBH based on IMDD and DSP-free electrical filtering. A 50-MHz square clock a 4/5-GHz sinusoidal clock were experimentally distributed and recovered with aggregate 41.09/51.31-Gb/s DWDM-OFDMA data signals over 40 km SSMF in a 25-GHz DWDM grid. Signal and clock performance was evaluated using both 10-GHz PIN and APD optical receivers, with no ONU-side optical amplification. Experimental results confirmed highly precise time and frequency accuracy, exceeding LTE-A requirements by an order of magnitude. Centrally-reconfigurable data and clock rates as well as flex-grid λ planning are supported by the system, which is potentially suitable for SDN-enabled network management. By supporting high data rates and low-latency synchronization, the system is promising for future optical MBH systems.

The system provides a low-latency digital signal processing (DSP)-free synchronous clock distribution and recovery scheme for high-speed dense wavelength division multiplexing orthogonal frequency division multiple access (DWDM-OFDMA)-based mobile backhaul (MBH) systems. Both a square wave clock and high-frequency sinusoidal clock signal required for OFDMA transceivers and mobile communication networks are provided simultaneously with flexible clock rates. The synchronous clock distribution is achieved jointly with high-speed OFDMA data signal transmission through a simple and low-cost intensity-modulation direct-detection (IMDD) optical backhaul architecture that also guarantees clock time and frequency stability. We experimentally verify 41.09-Gb/s aggregate DWDM-OFDMA data rates with distribution and recovery of 50-MHz square wave and 4-GHz sinusoid clocks over 40 km standard single mode fiber (SSMF) on a spectrally-efficient 25-GHz grid and no remote optical amplification. To demonstrate the flexibility of the system, 51.31-Gb/s DWDM-OFDMA transmission with 50-MHz square wave and 5-GHz sine wave clocks is also experimentally evaluated. Highly precise time and frequency accuracy is achieved, featuring an order of magnitude improvement with respect to LTE-Advanced (LTE-A) synchronization requirements. By supporting high bit rates, high spectral efficiency, and low-latency synchronization, the system is ideal for future optical MBH.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for clock distribution and recovery for an optical mobile backhaul, comprising:
   generating an Orthogonal Frequency-Division Multiple Access (OFDMA) signal with a transmitter (Tx) at an optical line terminal (OLT), the OFDMA signal generated by assigning orthogonal subcarriers to different cell sites through digital signal processing;
   generating two electrical clock signals: a baseband square wave clock, Csquare, that controls Tx-side digital logic and a sine wave clock Csine, that controls a digital to analog converter (DAC);
   combining the OFDMA signal and clock signals;
   intensity-modulating the resulting joint OFDMA signal+clock signal;
   optically multiplexing aggregate OFDMA signal+clock signals on multiple wavelengths with a dense wavelength division multiplexing DWDM λ-spacing;
   distributing at a remote node (RN) each wavelength by a de-multiplexer (Demux) to a designated general small cell area to which cell sites are connected by optical splitters; and
   photodetecting and digitizing received OFDMA signal and clock signals at each optical network unit (ONU), wherein downstream (DS) information for each cell is then digitally extracted and prepared for wireless radio frequency (RF) transmission over an air interface:
   wherein the clock signals are time and frequency synchronous with the OFDMA signal due to optical locking that occurs during intensity modulation of a combined Tx-side data and clock signal.

2. The method of claim 1, comprising providing a low-latency digital signal processing (DSP)-free synchronous clock distribution and recovery scheme for high-speed dense wavelength division multiplexing orthogonal frequency division multiple access (DWDM OFDMA)-based mobile backhaul (MBH) system.

3. The method of claim 1, wherein at the DAC output, the OFDMA signal is electrically combined with the two clock signals, and the aggregate electrical signal is applied as input to an optical intensity modulator (IM).

4. The method of claim 1, comprising separating the OFDMA signal and the clock signals in electrical frequency domain with moderate guard bands.

5. The method of claim 1, comprising multiplexing optical data and the clock signals from each OFDMA Tx using a DWDM multiplexer (Mux), and wavelength-demultiplexing in the RN to serve designated ONUs.

6. The method of claim 1, wherein at each ONU, joint data and clock signal is directly detected by a PD and electrically split into three parts.

7. A method for clock distribution and recovery for an optical mobile backhaul, comprising:
  generating an Orthogonal Frequency-Division Multiple Access (OFDMA) signal with a transmitter (Tx) at an optical line terminal (OLT), the OFDMA signal generated by assigning orthogonal subcarriers to different cell sites through digital signal processing;
  generating two electrical clock signals: a baseband square wave clock, Csquare, that controls Tx-side digital logic and a sine wave clock Csine, that controls a digital to analog converter (DAC);
  combining the OFDMA signal and clock signals;
  intensity-modulating the resulting joint OFDMA signal+ clock signal;
  optically multiplexing aggregate OFDMA signal+clock signals on multiple wavelengths with a dense wavelength division multiplexing DWDM λ-spacing;
  distributing at a remote node (RN) each wavelength by a de-multiplexer (Demux) to a designated general small cell area to which cell sites are connected by optical splitters; and
  photodetecting and digitizing received OFDMA signal and clock signals at each optical network unit (ONU), wherein downstream (DS) information for each cell is then digitally extracted and prepared for wireless radio frequency (RF) transmission over an air interface;
  providing a band-pass filter (BPF) and a lowpass filter (LPF) with passbands to filter out the Csine and the Csquare, respectively, for DSP-free clock recovery.

8. A communication system, comprising: an OFDMA transmitter (Tx) at an optical line terminal (OLT) generating an orthogonal frequency division multiple access OFDMA signal by assigning orthogonal subcarriers to different cell sites through digital logic and then intensity-modulating the resulting electrical OFDMA signal; an electrical multiplexer combining the electrical OFDMA signal with two electrical clock signals; an optical intensity modulator intensity-modulating the resulting joint electrical signal OFDMA+ clock signals; an optical multiplexer aggregate OFDMA signals on multiple wavelengths with tight Dense Wavelength Division Multiplexing DWDM λ-spacing; a remote node (RN) receiving the OFDMA signals, each wavelength is distributed by a de-multiplexer (Demux) to designated general small cell area, to which cell sites are connected by optical splatters; and an optical network unit (ONU) to directly photodetect and digitize received OFDMA signal, wherein downstream (DS) information for each cell is digitally extracted and prepared for wireless radio frequency (RF) transmission over an air interface; an electrical splitter, a bandpass filter (BPF) and a low pass filter (LPF) to separate
  the received OFDMA signals and the clock signals; wherein at the ONU, a joint data and clock signal is directly detected by a photo detector (PD) and is electrically split into three parts.

9. The system of claim 8, comprising an OFDMA modulator (Mod) in the OLT that generates the electrical OFDMA signal and electrical clock sources that generate a baseband square wave clock, Csquare, that controls Tx-side digital logic and a sine wave clock Csine that controls a digital to analog converter (DAC).

10. The system of claim 9, wherein the clock signals are time and frequency synchronous with the electrical OFDMA signal due to optical locking that occurs during intensity modulation of a Tx-side data and clock signal.

11. The system of claim 9, wherein at the DAC output, the electrical OFDMA signal is electrically combined with the two clock signals, and the aggregate electrical signal is applied as input to the optical intensity modulator (IM).

12. The system of claim 8, wherein the electrical OFDMA signal and the clock signals are separated in electrical frequency domain with moderate guard bands.

13. The system of claim 8, comprising combined optical data and the clock signals from each OFDMA Tx that are multiplexed using a DWDM multiplexer (Mux), and wavelength demultiplexed in the RN to serve designated ONUs.

14. The system of claim 8, comprising a band-pass filter (BPF) and a low-pass filter (LPF) with passbands to filter out Csine and Csquare, respectively, for DSP-free clock recovery.

15. The system of claim 8, wherein after an Rx-side OFDMA data processing, DS traffic is extracted and re-modulated into a target wireless format by an RF module, where a clock signal Csquare is multiplied using a phase locked loop (PLL) to achieve the desired carrier frequency.

* * * * *